(12) United States Patent
Kuzdzal

(10) Patent No.: US 9,897,344 B2
(45) Date of Patent: Feb. 20, 2018

(54) SOLAR COLLECTOR HAVING FRESNEL MIRRORS

(75) Inventor: Philippe Kuzdzal, Tassin-la-Demi-Lune (FR)

(73) Assignee: PK-ENR, Tassin-la-Demi-Lune (FR)

( * ) Notice: Subject to any disclaimer, the term of this patent is extended or adjusted under 35 U.S.C. 154(b) by 973 days.

(21) Appl. No.: 13/578,488

(22) PCT Filed: Feb. 8, 2011

(86) PCT No.: PCT/FR2011/050255
§ 371 (c)(1),
(2), (4) Date: Oct. 22, 2012

(87) PCT Pub. No.: WO2011/098715
PCT Pub. Date: Aug. 18, 2011

(65) Prior Publication Data
US 2013/0048053 A1    Feb. 28, 2013

(30) Foreign Application Priority Data
Feb. 12, 2010    (FR) ...................................... 10 00579

(51) Int. Cl.
*H01L 31/042* (2014.01)
*F24J 2/16* (2006.01)
(Continued)

(52) U.S. Cl.
CPC ............... *F24J 2/16* (2013.01); *F24J 2/5266* (2013.01); *F24J 2/541* (2013.01); *F24J 2/4638* (2013.01);
(Continued)

(58) Field of Classification Search
CPC ...... F24J 2/10; F24J 2/16; F24J 2/5266; F24J 2/54–2/5496; H02S 20/30
(Continued)

(56) References Cited

U.S. PATENT DOCUMENTS 3,861,379 A    1/1975    Anderson, Jr.
3,868,823 A    3/1975    Russell, Jr. et al.
(Continued)

FOREIGN PATENT DOCUMENTS

DE    2511740 A1    9/1976
DE    29518303 U1    6/1996
(Continued)

OTHER PUBLICATIONS

International Search Report and Written Opinion dated Apr. 25, 2012 by European Patent Office re: PCT/FR2011/050255; citing: WO 2010/099516 A1, WU 2009/056699 A1, DE 25 11 740 A1, U.S. Pat. No. 3,861,379 A, De 297 03 890 U1, DE 295 180 303 Us1 and U.S. Pat. No. 3,868,823 A.

*Primary Examiner* — Niki Bakhtiari
(74) *Attorney, Agent, or Firm* — Cantor Colburn LLP

(57) ABSTRACT

The present invention relates to a solar collector (1) having Fresnel mirrors comprising a mounting for a set of mirrors made up of strips of mirrors (2) referred to as primary mirrors (2), each pivoting about a respective axis of rotation (5) referred to as the large axis (5) relative to the mounting, and intended for collecting solar radiation and for concentrating said radiation toward one or more concentrating elements (100) which can be mutually similar or different, carrying a heat-transfer fluid, characterized in that the invention comprises a means (10, 20, 30) for moving one or more concentrating elements (100) such as to make the collector mobile relative to the mounting of the set of primary mirrors (2).

14 Claims, 10 Drawing Sheets

(51) Int. Cl.
*F24J 2/52* (2006.01)
*F24J 2/54* (2006.01)
*F24J 2/46* (2006.01)
*F24J 2/07* (2006.01)
*F24J 2/10* (2006.01)

(52) U.S. Cl.
CPC .... *F24J 2002/075* (2013.01); *F24J 2002/108* (2013.01); *F24J 2002/5458* (2013.01); *Y02E 10/47* (2013.01)

(58) Field of Classification Search
USPC .................................................. 136/243–265
See application file for complete search history.

(56) References Cited

U.S. PATENT DOCUMENTS

| | | | | |
|---|---|---|---|---|
| 4,022,184 A | * | 5/1977 | Anderson | ................. F24J 2/14 126/573 |
| 4,229,076 A | | 10/1980 | Chromie | |
| 4,297,521 A | * | 10/1981 | Johnson | ..................... F24J 2/06 126/605 |
| 5,592,932 A | * | 1/1997 | Yeomans | ................... F24J 2/07 126/600 |
| 2009/0000613 A1 | * | 1/2009 | Edwards | .................... F24J 2/16 126/684 |
| 2009/0056699 A1 | | 3/2009 | Mills et al. | |
| 2010/0212654 A1 | * | 8/2010 | Alejo Trevijano | ...... F24J 2/085 126/602 |
| 2011/0000515 A1 | * | 1/2011 | Patwardhan | ............... F24J 2/18 136/206 |
| 2011/0041894 A1 | * | 2/2011 | Liao | ......................... F24J 2/14 136/246 |

FOREIGN PATENT DOCUMENTS

| | | |
|---|---|---|
| DE | 29703890 U1 | 6/1997 |
| WO | 2010/099516 A1 | 9/2010 |

\* cited by examiner

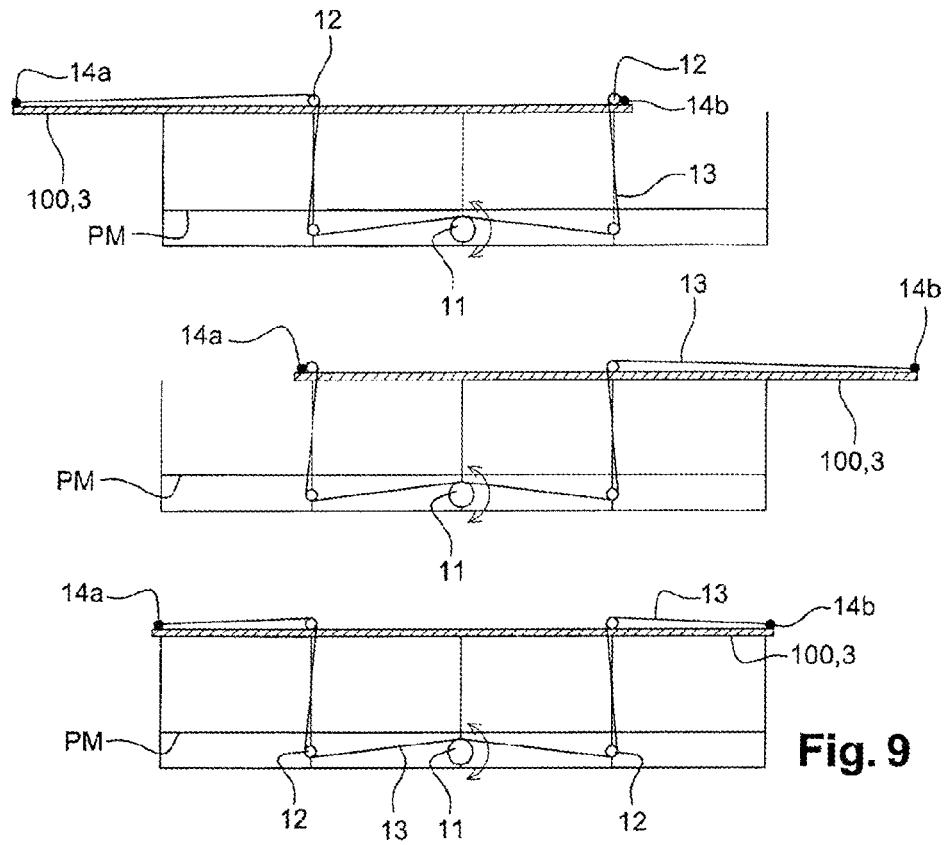
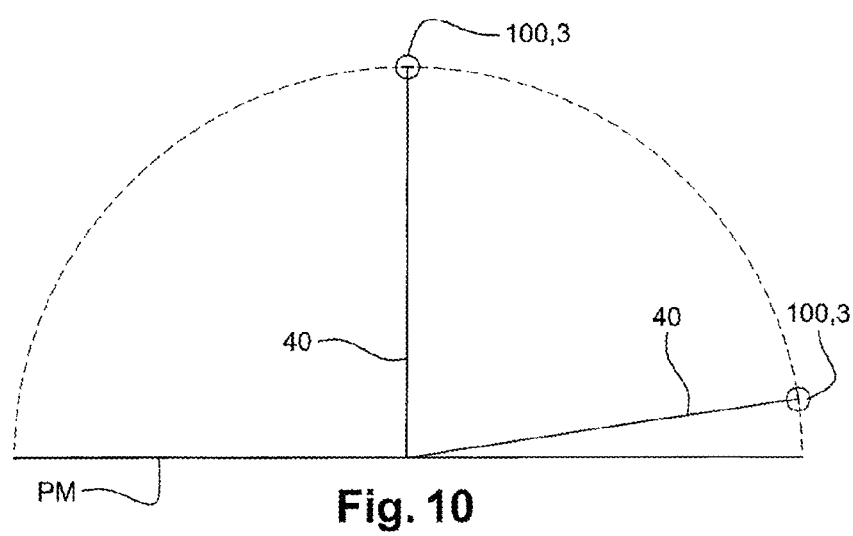

SOLAR COLLECTOR HAVING FRESNEL MIRRORS

TECHNICAL FIELD

The present invention relates to a solar power station with Fresnel mirrors comprising a support for a set of mirrors made up of strips of mirrors called primary mirrors, each pivoting around a respective axis of rotation, called large axis, relative to the support, and designed to collect the rays of the sun so as to concentrate them toward one or more concentrator elements of the same nature or different natures.

BACKGROUND

A set of Fresnel technology mirrors, hereafter called FTM, is made up of planar, longilineal rectangular mirrors. These longilineal mirrors are assembled to form strips of mirrors. For example, for an FTM assembly X meters long and 8 m wide, the strips of planar mirrors may have a length of X meters and a width from 5 to several 20 cm or more.

Each of the strips of planar mirrors can be oriented around its respective median axis, called large axis, which is generally horizontal and most of the time oriented in an East/West direction to give it an appropriate orientation to reflect the incident rays of the sun toward a concentrator element, such as a concentrator tube in which a coolant circulates.

The solar sensor generally has a vertical plane of symmetry passing through a median axis of the large axes of the planar mirrors. This plane of symmetry virtually separates the FTMs into two parts.

A Fresnel mirror solar power station also includes a secondary mirror, as an extension of the primary mirrors made up of the strips of planar mirrors. The secondary mirror generally has a mono or bicylindro-parabolic shape, is situated above the concentrator tube, and serves to reflect the portion of the radiation reflected by the FTMs that has not directly reached the concentrator tube toward the concentrator tube.

The secondary mirror is necessary in cases where the concentrator tube has a diameter smaller than the width of a primary planar mirror strip. However, the use of the secondary mirror slightly decreases the thermal flow reaching the concentrator tube, and therefore the heating thereof.

The decision not to install secondary mirrors means:
determining a width of the strips of planar mirrors smaller than the diameter of the tube (or of the tube provided with fins, as found on the market for vacuum tube heat sensors),
particularly precise subjugation of the strips of planar mirrors.

Since the installation of the concentrator tube is stationary, it is in theory possible to coordinate the movement of each of the strips of planar mirrors making up the FTMs relative to the position of the sun through a single actuator connected to each of the strips of planar mirrors, for example by a specific rod. The control and command device dedicated to following the sun is therefore very simple and inexpensive.

It is known from document U.S. Pat. No. 4,229,076 to arrange the set of strips of planar mirrors of the FTMs on a support that can be oriented along a vertical axis so that the median axis of the large axes of the planar mirrors follows the azimuth of the sun.

In this way, one substantially decreases the length of the ineffective area of the concentrator tube, i.e. the area of the tube not reached and therefore not heated by the rays of the sun reflected by the strips of planar mirrors, and on the other hand the length of the lost area, i.e. the area of the space located in the extension of the tube and that is passed through by the rays of sunlight reflected by the strips of planar mirrors without the latter contributing to heating the concentrator tube.

The solar power stations with Fresnel mirrors are satisfactory for low altitudes below 30° North or South in that they make it possible to heat a coolant circulating in the concentrator tube to effective temperatures to produce hot water or steam directly or through a heat exchanger. The steam then actuates a turbine, which produces electricity.

This form of energy production has several advantages, including using a renewable energy source that is free and nonpolluting. Furthermore, using FTMs makes it possible to produce, at a low cost, a large surface to collect the rays of the sun. Furthermore, the planar surface of the mirrors is relatively easy to clean compared to surfaces of curved mirrors.

In fact, the planar mirrors are less expensive to manufacture and maintain than the parabolic or cylindro-parabolic mirrors used for similar applications; their installation requires a relatively light structure and their orientation, around a single axis, requires relatively simple means to implement. It is therefore easy to produce and maintain a surface to collect the rays of the sun that has large dimensions and a lower cost.

These Fresnel mirror solar power stations also have the advantage of being able to be installed easily in urban settings. For example, it is possible to install FTMs at 50 cm from the ground on building terraces without particular inconvenience due to their visibility or the risk of flight under the action of the wind, that risk being more significant for the parabolic or cylindro-parabolic mirrors, which can generate pressure gradients between the front and rear surfaces thereof due to their curvature.

The FTMs are installed on stationary structures, their large axes being oriented most of the time along an East/West axis allowing them to collect maximum radiation during the relative movement of the sun in the sky.

However, since the sun does not rise strictly in the East and does not set strictly in the West, and for relatively low heights of the sun on the horizon, i.e. primarily close to the sunrise and sunset positions, and for one of the two parts of the FTMs previously defined, the end of the first strip of planar mirrors positioned first relative to the sun and oriented in rotation around its large axis to reflect the radiation thereof, conceals part of a second strip of planar mirrors adjacent to the first and further from the sun by creating a shadowed zone thereon.

This concealment of the incident radiation is maximal two times during the day: once in the morning and once in the evening, the shade area on a strip of mirrors being situated sometimes on one edge, sometimes on the other for these two periods of the day.

The surface occupied by the shadow zone on the second strip of mirror is not active, as it does not contribute to heating the concentrator tube.

Likewise, for the same relatively low heights of the sun, and for the second part of the FTMs previously defined, the radiation reflected on one end of a first strip of planar mirrors oriented to reflect the incident radiation coming from the sun on the concentrator tube can be concealed by an end of a second, adjacent strip of planar mirrors, which is also oriented to reflect the incident rays of the sun on the concentrator tube, while creating a lost area on the first strip of mirrors.

This concealment of the reflected radiation is maximal two times during the day: once in the morning and once in the evening, the lost area on a strip of mirrors being situated sometimes on one edge, sometimes on the other edge for these two periods of the day.

The surface occupied by the lost area on the first strip of mirrors is also not active, as it does not contribute to heating the concentrator tube.

The presence of these surfaces reduces the quantity of reflected radiation contributing to heating the concentrator tube. The area of the surfaces depends on:
   the width of the strips of mirrors,
      the space between the strips of mirrors to allow them sufficient play,
      the angle of incidence of the incident ray and therefore the height of the sun,
      the position of the concentrator tube, in particular its distance from the strips of mirrors.

However, the main drawback of the Fresnel mirror solar power stations as they are described in the state of the art lies in the fact that they must be installed in locations with a relatively low latitude to have satisfactory yields.

The first reason for this necessity is factual: in these low-latitude regions, i.e. close to the equator, the annual average sunshine is higher than in middle-latitude regions, such as France, for example, and high-latitude regions.

The second reason, which is more technical, is related to the fact that the solar rays at these latitudes are relatively low. Thus, for a location situated at 45° North, the height of the sun at noon in winter will be approximately 23°, and in summer approximately 68°.

Under these conditions, the Fresnel mirror solar power station operates with angles of incidence reducing the performance of the power station.

It has been observed that the rays of the sun striking the strips of planar mirrors with an angle of incidence of 23° generate radiation reflected in the longitudinal direction of the tube reaching the concentrator tube quite far from their point of origin situated on the strips of planar mirrors, generating an ineffective area on the concentrator tube in which this type of reflected radiation does not contribute to the thermal flow.

Likewise, part of the reflected radiation does not reach the concentrator tube, and generates a lost area in which this type of reflected radiation does not contribute to the thermal flow.

These two lacks of contribution reduce the potential heat production of the solar sensor intended to heat the coolant located inside the concentrator tube.

As previously seen for document U.S. Pat. No. 4,229,076, this drawback may be resolved in part by installing FTMs on the support pivoting around a vertical axis.

However, this implementation requires having a free surface corresponding to a disk portion with a diameter equal to the length of the strips of mirrors to allow the FTMs to pivot on a vertical axis.

An economic analysis shows that the solution is not compatible with the property surface areas made available on roofs or building terraces.

Furthermore, the effectiveness of such solar sensors is directly related to whether the solar disk is or is not visible. Such sensors are not effective when the disk of the sun is not visible, for example in cloudy weather, which occurs frequently in the middle-latitude areas.

However, the solar power is characterized by the direct rays of the visible disk and the radiation diffused in random directions.

For an annual period, in given geographic locations, the power ratio between the direct radiation and the diffuse radiation may approach 1.

In these cases, the annual direct radiation power is of the same order as the annual power of the diffuse radiation per unit of horizontal surface.

The diffuse radiation should also be used in a solar sensor.

Lastly, the use of such a solar sensor should not be limited solely to heat production.

BRIEF SUMMARY

The present invention aims to resolve all or part of the aforementioned drawbacks.

For all of the preceding, the quantity of reflected radiation reaching one of the concentrator elements has an optimum for each position of the sun depending on the height and the azimuth, i.e. the horizontal projection of its direction relative to the geographical North. This performance of the Fresnel mirror solar power station therefore depends on the following parameters:
   direction of the large axis of the FTMs, corresponding to the main direction assumed by each of the strips of longilineal mirrors,
   position of the geographic location, and
   installation of the concentrator tube relative to the apron of the FTMs.

The variation of the direction of the large axis of each of the FTMs leads to a solution described in document U.S. Pat. No. 4,229,076, that solution not being compatible in an urban setting.

The position of the geographical location therefore considerably influences the performance of a solar power station, the regions of middle and high latitudes not being preferred geographic positions.

The installation of the concentrator element(s) appears to have to remain stationary relative to the apron supporting the FTMs, the latter transporting a coolant.

The present invention goes against this technical prejudice and proposes a Fresnel mirror solar power station comprising a support for a set of mirrors made up of strips of mirrors called primary mirrors, each pivoting around a respective axis of rotation, called large axis, relative to the support, and designed to collect the rays of the sun so as to concentrate them toward one or more concentrator elements of the same nature or different natures, characterized in that said solar power station comprises means for moving one or more concentrator elements so as to make it movable relative to the support of the set of primary mirrors.

This arrangement makes it possible to have a Fresnel mirror solar sensor with satisfactory efficiency at all latitudes, in all seasons without needing to have a larger surface area than that occupied by the set of primary mirrors. In this way, their installation can in particular be considered in urban areas on roofs or building terraces.

According to one embodiment, one or more concentrator elements is or are a concentrator tube passed through by a coolant.

This arrangement allows exploitation of the solar sensor allowing heating of the coolant.

According to one embodiment, one or more concentrator element(s) is or are a photovoltaic module.

This arrangement allows exploitation of the solar sensor making it possible to produce electricity.

According to one embodiment, the movement means include means for longitudinal movements allowing movement of the concentrator element(s) in a horizontal plane and in a direction substantially longitudinal to the direction of the large axes of the primary mirrors.

This arrangement allows the longitudinal reflected rays to reach the preceding so-called ineffective area of the concentrator element(s), and to recover the thermal and/or light flow generated by the longitudinal reflected rays previously passing in said lost area, which increases the effectiveness of the solar sensor.

According to one embodiment, the movement means include means for transverse movements allowing movement of the concentrator element(s) in a vertical plane and in a direction substantially transverse to the direction of the large axes of the primary mirrors.

This arrangement makes it possible to decrease the incline of the primary mirrors on their large axis, which reduces the surface of the shadow area and the lost area on the primary mirrors, which increases the effectiveness of the solar sensor.

According to one embodiment, the movement means include means for lateral movements allowing movement of the concentrator element(s) in a horizontal plane and in a lateral direction substantially transverse to the direction of the large axes of the primary mirrors.

This arrangement makes it possible to decrease the incline of the primary mirrors on their large axis, which reduces the surface of the shadow areas and lost area on the primary mirrors, which increases the effectiveness of the solar sensor.

According to one embodiment, the solar power station comprises actuating means for rotating the primary mirrors around their large axis as a function of the height of the sun and in which the movement of the concentrator element(s) created by the movement means depends on the movement of the primary mirrors.

According to one embodiment, the solar power station comprises a secondary mirror designed to reflect toward the concentrator element(s) part of the radiation reflected by the primary mirrors that does not directly reach the concentrator element(s) and in which the secondary mirror follows the movement of the concentrator element(s) and is rotatably movable around the primary axis of the concentrator element(s).

According to the same embodiment, the secondary mirror has an opening angle whereof the bisector is oriented in rotation around the concentrator tube to coincide with the bisector of the angle formed by the intersection of the two extreme reflected rays sent back by the set of primary mirrors.

According to one embodiment, the solar power station comprises a device for making the positioning of the primary mirrors idle in case of strong wind.

According to one embodiment, the solar power station comprises a device for making the positioning of the primary mirrors idle, autonomous and with positive security in the event of a loss of current.

According to one embodiment, the solar power station comprises a device for putting the primary mirrors and/or the concentrator element(s) in the maintenance position.

According to one embodiment, the solar power station comprises a manual operation device allowing an operator to orient the primary mirrors to his liking and to position the concentrator element(s).

According to one embodiment, the solar power station comprises an automated cleaning device for the primary mirrors.

According to one embodiment, the solar power station comprises at least one thermal sensor arranged to absorb a diffuse radiation.

This arrangement makes it possible to recover calories coming from the diffuse solar radiation of the sun.

According to one embodiment, the thermal sensor comprises a heat exchanger in communication with the coolant circulating in the concentrator tube(s).

This arrangement makes it possible to provide additional calories to the coolant circulating in the concentrator tube(s).

According to one embodiment, the at least one thermal sensor is rotatably movable around an axis of substantially the same direction as the large axis of each of the primary mirrors.

This arrangement makes it possible always to have an optimal surface thermally calculated according to the height and the azimuth of the sun.

According to one embodiment, the primary mirrors comprise a rear surface including photovoltaic modules, the pivoting movement of each of the primary mirrors around their respective large axes in relation to the support allowing a rear surface to take the place of a front surface and vice versa.

This arrangement makes it possible to go from an operating mode favoring the heating of a coolant to an operating mode exclusively dedicated to producing electricity.

BRIEF DESCRIPTION OF THE DRAWINGS

In any event, the invention will be well understood using the following description, in relation to the appended diagrammatic drawing, showing, as a non-limiting example, one or more embodiments of the solar sensor.

FIG. 9 shows one example of longitudinal movement means allowing a movement of the concentrator tube in a horizontal plane and in a direction substantially longitudinal to the direction of the large axes of the primary mirrors in a solar sensor according to the invention.

FIG. 10 illustrates an example of movement means allowing movement of the concentrator tube heightwise and laterally to the large axes of the primary mirrors in a solar sensor according to the invention.

DETAILED DESCRIPTION

Figure 1:
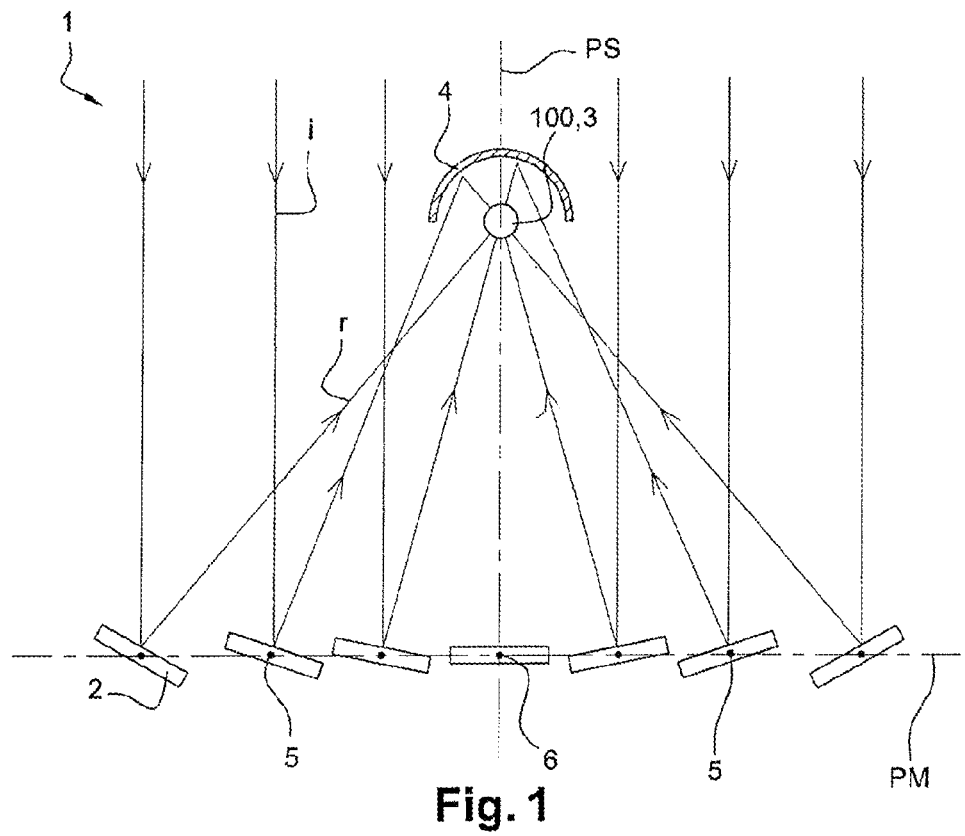
FIG. 1 illustrates the operation of a Fresnel mirror solar sensor according to the state of the art.

As illustrated in FIG. 1, a Fresnel mirror solar sensor 1 comprises a set of Fresnel mirrors called primary mirrors 2 capable of collecting incident rays i from the sun to have them converge in the form of reflected rays r toward a concentrator element 100 formed by a concentrator tube 3.

The reflected rays r not directly reaching the concentrator tube 3 are sent thereon using a secondary mirror 4 with a cylindro-parabolic shape.

The thermal flow generated by the concentration of the reflected rays r heats the concentrator tube 3 as well as the coolant it conveys.

All of the primary mirrors 2 are planar, longilineal, and can each be oriented in rotation around their respective large axis 5. This orientation varies as a function of the position of the sun in the sky defined by its height and its azimuth.

The orientation of the primary mirrors is symmetrical around a vertical plane PS passing through a median axis 6 to all of the large axes 5 of the primary mirrors 2. This plane PS separates the set of primary mirrors 2 into two symmetrical parts P1 and P2.

In a solar sensor 1 according to the state of the art, the concentrator tube 3 as well as the secondary mirror 4 are both stationary in relation to the primary mirrors 2.

Figure 2:
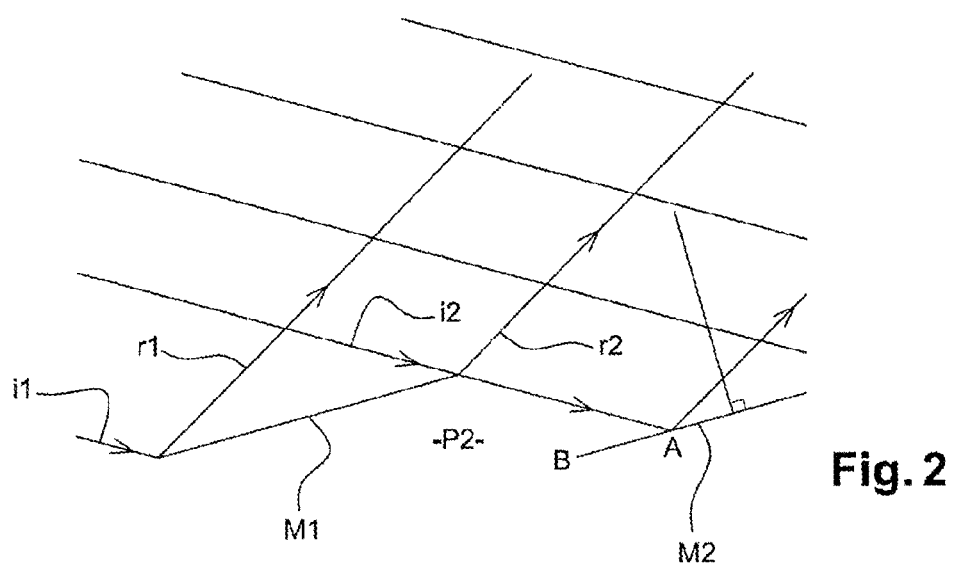
FIG. 2 illustrates the shadow cast by a primary mirror on the incident rays between two adjacent strips of primary mirrors of a first part of a set of Fresnel technology mirrors.

As illustrated in FIG. 2, in such a solar sensor 1, for relatively low heights of the sun and mirrors M1 and M2 located in the part P2 of the solar sensor, the end of the first mirror M1 casts a shadow on the end of the second mirror M2 between the portion AB by concealing part of the incident rays i.

Figure 3:
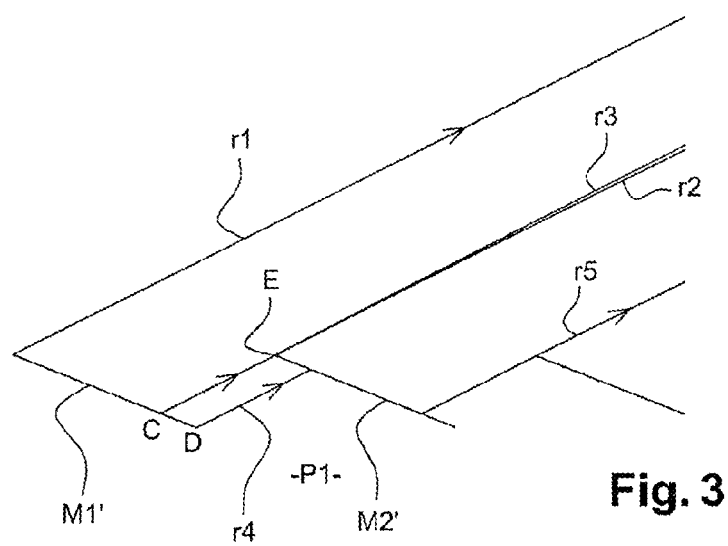
FIG. 3 illustrates the concealment of rays reflected by a primary mirror between two adjacent strips of primary mirrors of the second part of a set of Fresnel technology mirrors.

As illustrated in FIG. 3, in such a solar sensor 1, for heights of the sun that are also relatively low, but for mirrors M1' and M2' located in the part P1 of the solar sensor, the mirror M1' is completely reached by the incident rays i, but the reflected rays r coming from the incident rays i striking the portion CD are stopped by the rear surface of the mirror M2'.

In the two preceding examples, the part P1 is closer to the sun than the part P2 for a same relatively low height of the sun.

These two FIGS. 2 and 3 show the need to reduce the portions AB and CD, and therefore the incline of the primary mirrors 2 on their large axis 5.

To resolve this problem, the invention proposes to make the concentrator tube 3 movable, in particular using transverse 20 and lateral 30 movement means for the concentrator tube 3.

Figure 6:
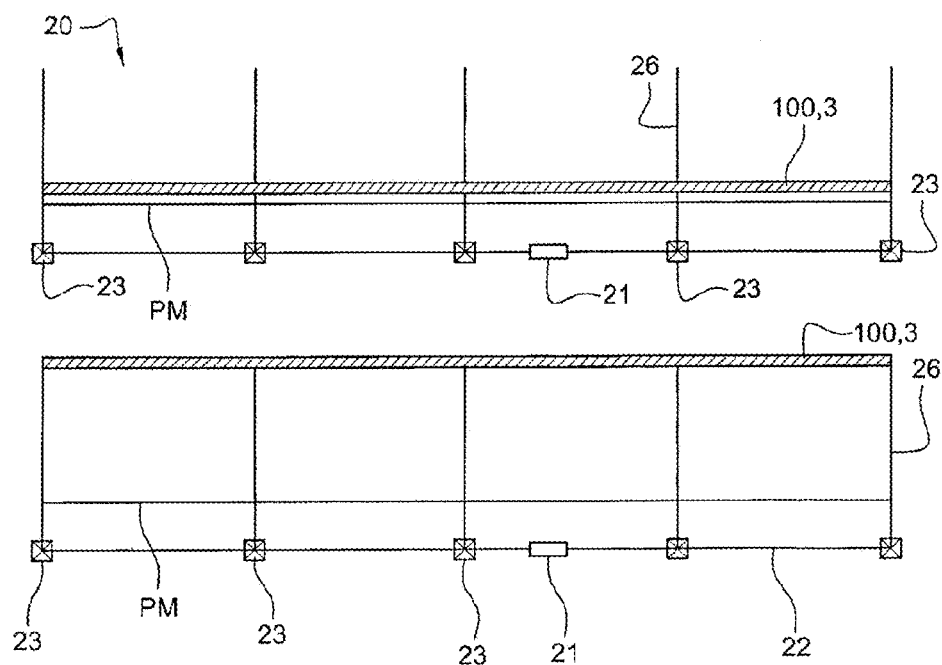
FIG. 6 shows an example of transverse movement means allowing a movement of the concentrator tube in a vertical plane and in a direction substantially transverse to the direction of the large axes of the primary mirrors in a solar sensor according to the invention.
Figure 7:
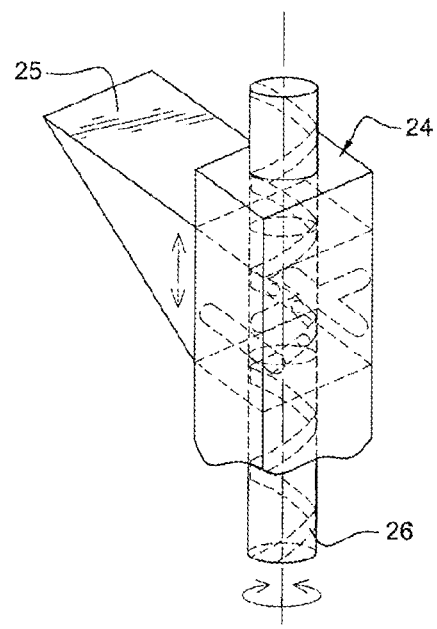
FIG. 7 shows the detail of part of the transverse movement means of FIG. 6.

FIGS. 6 and 7 illustrate one embodiment of the invention with an example embodiment of transverse movement means 20 that can be used.

In the embodiment shown, the transverse movement means 20 include a drive motor 21, a drive shaft 22, a set of mechanical cylinders 23 with worms 26 with reflection at a right angle, a support structure 24 on worms 26, and a fastening support 25 for the concentrator tube 3.

The rotation of the drive motor 21 rotates the drive shaft 22, which actuates the set of mechanical cylinders 23 with worms 26 with reflection at a right angle in a synchronized manner.

The mechanical cylinders 23 with worms 26 with reflection at a right angle are uniformly distributed along the concentrator tube 3. Their number may vary as a function of the dimensions of the concentrator tube 3.

The worms 26 of the cylinders 23 constitute self-supporting beams for the concentrator tube 3.

Depending on the direction of rotation of the drive motor 21, the rotational movement of the worm 26 of the mechanical cylinders 23 creates an upward or downward translational movement of the movable support structure 24 mounted on the worms 26.

The fastening support 25 is secured both to the movable support structure 24 and the concentrator tube 3.

Thus, depending on the direction of rotation of the drive motor 21, the concentrator tube 3 will be translated in a first direction or a second transverse direction.

The more fine the pitch of the worm 26, the more precise the vertical translation of the concentrator tube 3.

These transverse movement means 20 use positive security, since the pitch of the worms 26 is chosen to prohibit any self-reversibility of the movement, for example in case of power failure.

Structurally, the vertical self-supporting beams may be rigged if necessary.

Other solutions may also be used by cables or non-extensible textile ropes of the Kevlar® type or a similar type, by using universally known properties, such as hoists.

Figure 8:
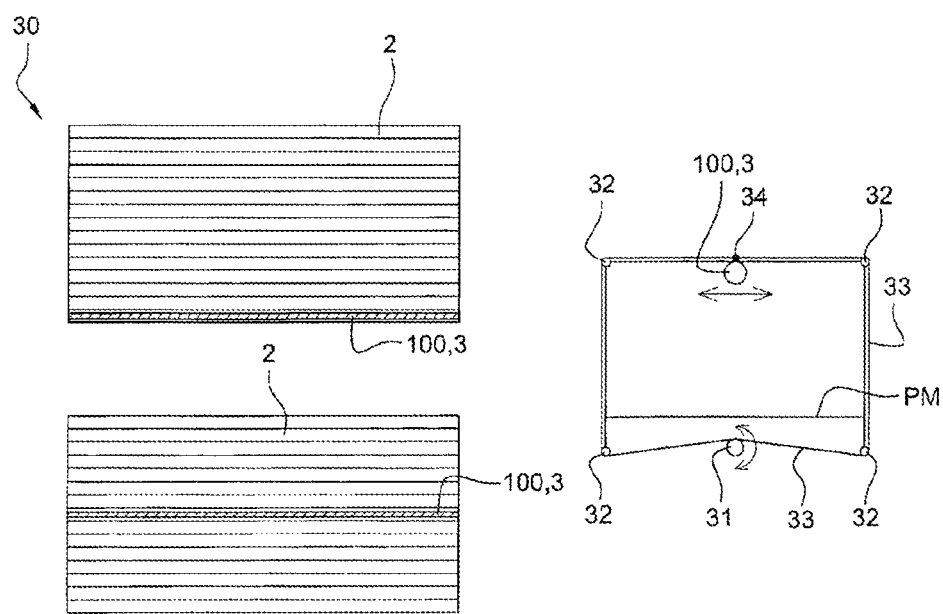
FIG. 8 shows one example of lateral movement means allowing movement of the concentrator tube in a horizontal plane and in a lateral direction substantially transverse to the direction of the large axes of the primary mirrors in a solar sensor according to the invention.

FIG. 8 illustrates one embodiment of the invention with an example embodiment of lateral movement means 30 that can be used.

In the illustrated embodiment, the lateral movement means 30 include a drive motor 31, return pulleys 32, a cable 33 and a stationary point 34.

In this example, the drive motor 31 is positioned substantially at the vertical below the concentrator tube 3 when the latter is in the median position of its travel.

The rotation of the drive motor 31 substantially translates the cable 13 in a direction directly depending on the direction of rotation of the drive motor 31.

The cable 33 is non-extensible and may, for example, be made up of a non-extensible textile rope of the Kevlar® type or a similar type.

Two first return pulleys 32 are laterally positioned on either side of the drive motor 31 substantially in the same horizontal plane. These first two return pulleys 32 return the cable 33 substantially in the vertical direction.

Two other return pulleys 32 are arranged on either side of the concentrator tube 3 and each return the cable 33 on the stationary point 34.

The stationary point 34 is secured to the concentrator tube 3 and the cable 13 is fastened on said stationary point 34.

In this way, depending on the direction of rotation of the drive motor 31, the concentrator tube 3 will be translated in a first or second transverse direction.

Figure 5:
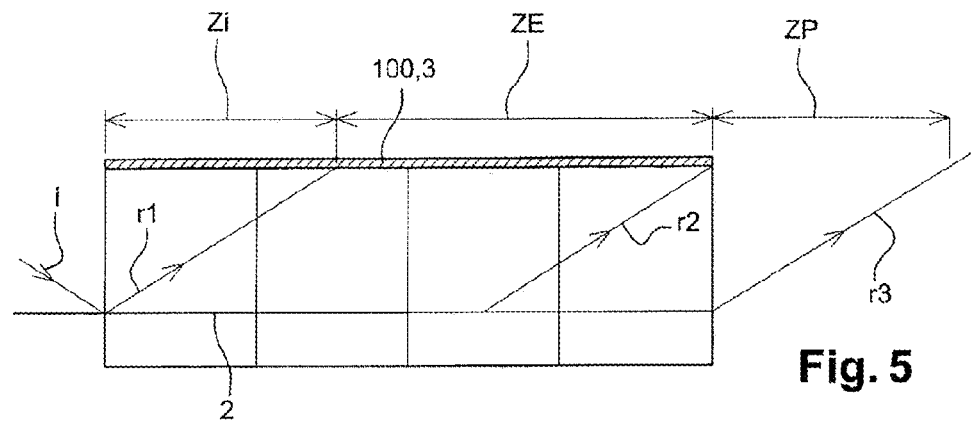
FIG. 5 illustrates the trajectory of the longitudinal reflected rays for a solar sensor installed at middle or high latitudes.

FIG. 5 illustrates the heat loss caused by the position of the concentrator tube 3 relative to the reflected rays r longitudinal to the concentrator tube 3 for a solar sensor 1 installed at a middle latitude.

At middle latitudes, the angle of incidence of the incident rays i is small, and as a result the reflection angle r is also small. Under these conditions, part of the reflected ray r does not reach the concentrator tube 3. The area not reached by the reflected rays is called the ineffective area ZI of the concentrator tube 3. Part of the reflected radiation r is not intercepted by the concentrator tube 3. The area transparent to the reflected rays r is called the lost area ZP. In this way, the longitudinal reflected rays r only contribute heat to the concentrator tube 3 over a limited distance of the concentrator tube 3 called effective area ZE situated between the ineffective area ZI and the lost area ZP.

This FIG. 5 clearly illustrates the need to move the concentrator tube 3 longitudinally to the large axes 5 of the primary mirrors 2 to recover a maximum of longitudinal reflected rays r as well as maximum exposure of the concentrator tube 3 to said longitudinal reflected rays r.

To meet this expectation, the invention provides longitudinal movement means 10.

FIG. 9 illustrates one embodiment of the invention with one example embodiment of longitudinal movement means 10 that can be used.

In the illustrated example, the longitudinal movement means 10 include a drive motor 11, return pulleys 12, a cable 13 and two stationary points 14a and 14a.

In this example, the drive motor 11 is positioned substantially in the median position of the travel of the concentrator tube 3 and below it.

The rotation of the drive motor 11 translates the cable 13 in a direction directly depending on the direction of rotation of the drive motor 11.

The cable 13 is non-extensible and may for example be made from a non-extensible textile rope of the Kevlar® type or a similar type.

Two first return pulleys 12 are positioned laterally on either side of the drive motor 11 substantially in the same horizontal plane. These two first return pulleys 12 return the cable 13 substantially to the vertical toward the concentrator tube 3.

Two other return pulleys 12 are positioned above the concentrator tube 3 and each return one end of the cable 13 to one of the two stationary points 14a and 14b.

The two stationary points 14a and 14b are secured to the concentrator tube 3 and each of the two ends of the cable 13 is fastened on one of the two stationary points 14a, 14b.

Thus, depending on the direction of rotation of the drive motor 11, the concentrator tube 3 will be translated in a first or second longitudinal direction.

All of the example embodiments to produce the vertical, lateral and longitudinal movement of the concentrator tube 3 may be combined in a well-known manner by offsetting the stationary points of two of the three movement means previously described, on two support platens each supporting different movement means.

To be able to perform these movements freely, the ends of the concentrator tube 3 are connected to the rest of the circuit conveying the coolant through flexible junctions.

FIG. 10 proposes a technical solution meeting several of the properties previously described. This comprises fastening the concentrator tube 3 to an end of an oscillating arm 40 of suitable size.

The oscillating arm 40 may be moved hydraulically or by cable (not shown).

The movement thus obtained allows the tube to move vertically heightwise and laterally in a direction transverse to the large axes 5 of the primary mirrors 2.

Figure 11:
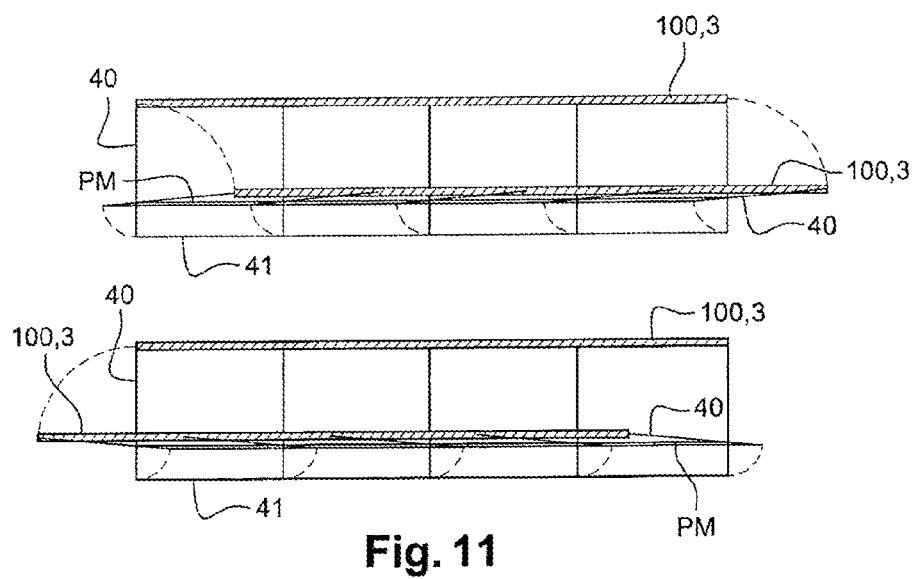
FIG. 11 shows another solution for positioning the concentrator tube with movement means allowing movement of the concentrator longitudinally to the large axes of the primary mirrors in a solar sensor according to the invention.

FIG. 11 illustrates another solution for positioning the concentrator tube 3 relative to planar mirrors 2.

This solution comprises adapting the solution of the oscillating arm such that the concentrator tube 3 rises and lowers in a direction longitudinal to the large axes 5 of the planar mirrors 2.

The example embodiment shown in this FIG. 11 illustrates the position of the concentrator tube in the morning (on top) and in the evening (on bottom).

In this example embodiment, the concentrator tube is connected to five oscillating arms with an axis of rotation located at the plane PM of the large axes of the planar mirrors 2. Each of the five oscillating arms 40 is connected on one of its two ends to the concentrator tube 3, and on the other of its ends to transmission means coordinating the movement of the set of oscillating arms 40.

In this way, the concentrator tube 3 can be brought closer to the plane including all of the large axes 5 of the primary mirrors 2 and also position itself to recover maximal longitudinal reflected rays r as well as maximal exposure of the concentrator tube 3 to said longitudinal reflected rays r.

It is not necessary to orient the secondary mirror 4 in the longitudinal direction.

Figure 4:
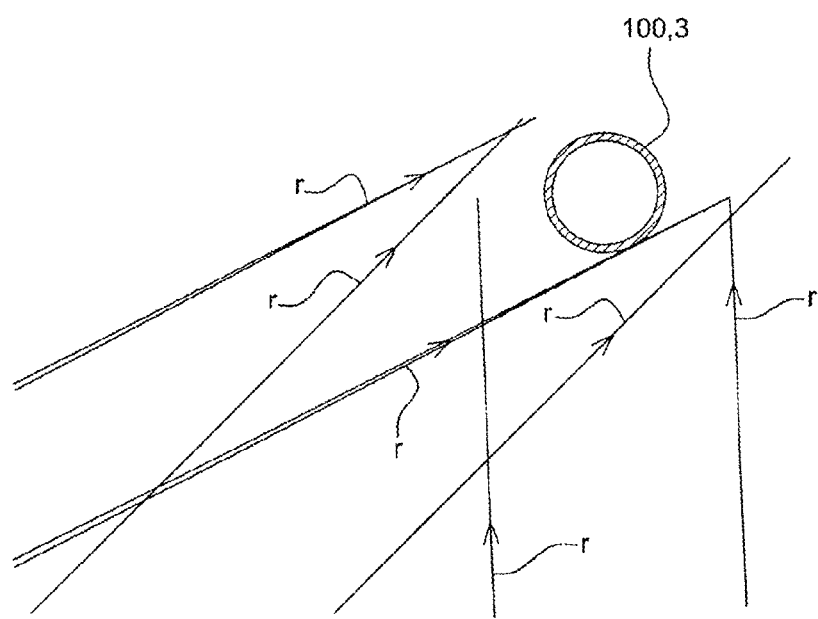
FIG. 4 illustrates the need to use a secondary mirror in a solar sensor.

FIG. 4 illustrates the need to position a secondary mirror 4 in the case where the width of the primary mirrors 2 is larger than the diameter of the concentrator tube 3. In fact, under these conditions, part of the reflected rays r pass next to the concentrator tube 3 without reaching it. The usefulness of a secondary mirror 4 positioned behind the concentrator tube 3 is therefore understood to reconvey said reflected rays r on the concentrator tube 3.

According to the invention, the secondary mirror 4 follows the movements of the concentrator tube 3 and is rotatably movable around the axis of the concentrator tube 3.

Figure 12:
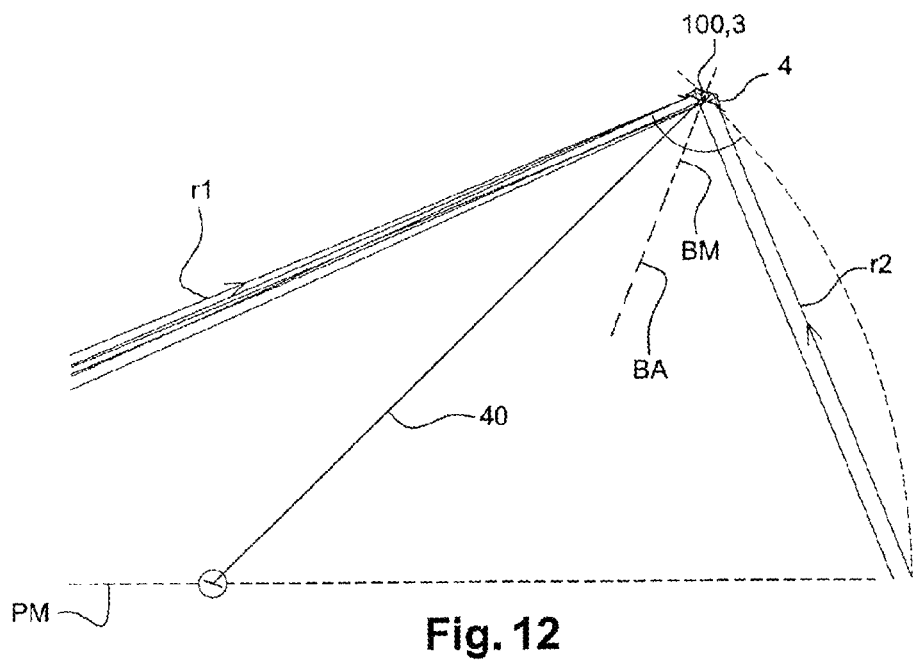
FIG. 12 illustrates the positioning of the concentrator tube and its secondary mirror in a solar sensor according to the invention.

The orientation assumed by the secondary mirror as a function of the position of the concentrator tube is illustrated in FIG. 12 in combination with the embodiment illustrated in FIG. 10 proposing the use of an oscillating arm 40 for the vertical and lateral movement of the concentrator tube 3.

The rotation of the secondary mirror 4 around the concentrator tube 3 can thus be ensured by a connecting rod device (not illustrated), for example, using the position of the oscillating arm 40 relative to the plane including all of the large axes 5 of the primary mirrors 2 as reference.

This connecting rod device orients the secondary mirror 4 so that the bisector BM of its opening angle is combined with the bisector BA of the angle formed by the intersection of the two extreme reflected rays r.

The use of a hydraulic transmission (not illustrated) coupled to a hydraulic distributor (not illustrated) positions the secondary mirror 4 by acting on the travel of the connecting rods. A traditional system for controlling the position (not shown) of the drawer of the distributor is used to know the position of the secondary mirror 4 at all times.

Unlike the solar sensors 1 of the state of the art, the rotational movement of the primary mirrors 2 around their large axes 5 as a function of the height of the sun in a solar sensor 1 according to the invention, it is advantageous to use a nonlinear function with individual actuation of each of the primary mirrors 2.

As a result, there are two types of solutions to manage the rotation of the rows of primary mirrors 2:
electromechanically, or
mechanically.

In the first scenario, it is advantageous to produce the same number of electrical interlock lines to control the electromechanical actuators of each of the groups of primary mirrors 2.

In the second scenario, a simple mechanical interlock allows the mobility of the primary mirrors 2 with a system of axes/rods.

The mobility of the concentrator tube 3, with the aim of significantly improving the effectiveness of the solar sensor 1, causes the complexity of the relationships coordinating the movement of the primary mirrors 2 with the movement of the concentrator tube 3 and its secondary mirror 4.

As a result, to facilitate the adjustments to be done on the interlocks described above, the latter are calculated from a digital simulator.

This digital simulator also makes it possible to identify the optimal location of the concentrator tube 3 as a function of the height of the sun, its azimuth, and the direction of the tube, which is parallel to that of the large axes 5 of the primary mirrors 2.

The digital simulator will, among other things, make it possible to determine the ideal characteristics of the solar sensor 1 according to:
the installation site of the solar sensor 1,
the usage priority; i.e. if winter production is favored for heating and hot water or summer for hot water and solar air conditioning.

The complete simulator also integrates the solar parameters and meteorological statistics and radiation of the location of the site to be studied for the installation of a solar sensor 1.

Thus, the simulator combines:
the theoretical performance of the solar sensor 1 whereof the installation is considered, this depending on the size of the primary mirrors 2, the size of the space between the primary mirrors 2, the installation of the concentrator tube 3 integrating its position relative to the median axis 6 of the set of large axes 5 of the primary mirrors 2 and its elevation relative to the plane PM comprising the set of large axes 5 of the primary mirrors 2, the estimated average optical output, and the orientation of the median axis 3 of the set of large axes 5 of the primary mirrors 2,
the travel of the sun for a period of one year, i.e. its azimuth and its height relative to the horizon, and the statistical data of the radiation of the concerned site, integrating the variation of the nebulosity.

The simulation pitch is one hour per site considered.

The solar sensor 1 also provides several security and maintenance devices.

In particular, a device for making the positioning of the primary mirrors idle in case of major wind is provided.

This device includes an anemometer providing information on the wind speed and provides a speed threshold beyond which the device sends the order to the actuators to orient the plane of the surface of the set of primary mirrors 2 substantially in the vertical direction and return the concentrator tube 3 to a position close to the plane PM comprising the set of major axes 5 of the primary mirrors 2.

This position of the primary mirrors 2 and the concentrator tube 3 is also adopted under the order of an autonomous idling device with positive security in the event of a power failure.

For preventive maintenance, the sensor also provides a device for putting the primary mirrors and/or the concentrator tube in a maintenance position allowing an operator to easily perform the maintenance services for the solar sensor 1 accessibly, without needing a nacelle or other scaffolding.

For more corrective maintenance, the solar sensor provides a manual operation device allowing an operator to orient the primary mirrors 2 as he wishes and to position the concentrator tube 3.

For upkeep of the solar sensor 1, the latter provides an automated cleaning device for the primary mirrors 2, alone or with the secondary mirror 4. This device, for example comprising a rotary brush, can operate even in the case of the maintenance or security position of the solar sensor 1.

According to an embodiment illustrated in FIGS. 13 to 18, the solar sensor 1 includes a first thermal sensor 50*a* and a second thermal sensor 50*b* positioned in the immediate vicinity of the set of planar mirrors 2.

The first thermal sensor 50*a* and the second thermal sensor 50*b* are respectively rotatable around an axis A1 and around an axis A2.

As illustrated in all FIGS. 13 to 18, the axes of rotation A1, A2 are arranged in the same direction as the direction of the large axes A of the planar mirrors 2.

Furthermore, these axes A1, A2 are preferably arranged at the outer lateral edges of the two extreme planar mirrors so as not to create a shadow zone on the planar mirrors 2 for the various positions assumed by the sun in the sky throughout the day.

Figure 13:
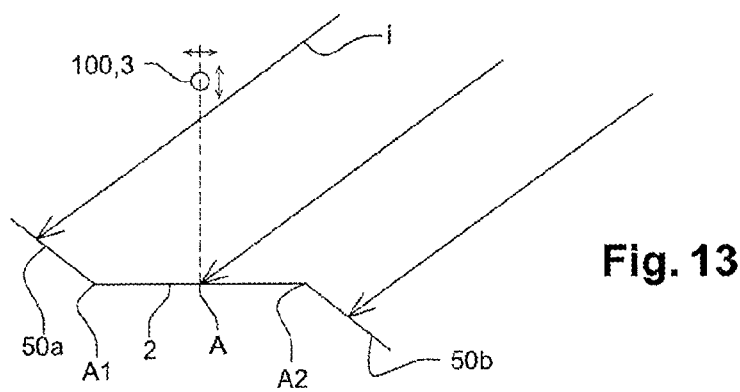
FIG. 13 illustrates a first positioning of the different primary mirrors and thermal sensors of a solar sensor with Fresnel mirrors for a first direction of the direct radiation of the sun according to another aspect of the invention.
Figure 14:
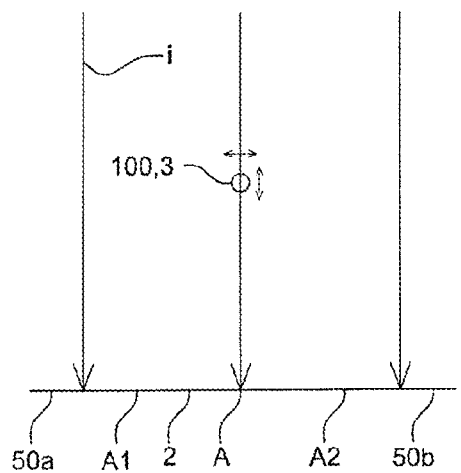
FIG. 14 illustrates a second position of the different primary mirrors and thermal sensors of the solar sensor of FIG. 13 for a second direction of the direct radiation of the sun.
Figure 15:
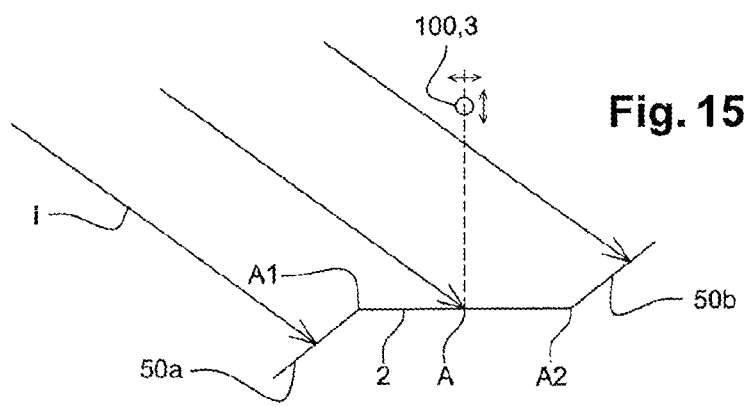
FIG. 15 illustrates a third position of the different primary mirrors and thermal sensors of the solar sensor of FIGS. 13 to 14 for a third direction of the direct radiation of the sun.

Thus, the position of the thermal sensors 50*a*, 50*b* is illustrated in FIG. 13 for a position corresponding to the morning, in FIG. 14 for position corresponding to noontime, and in FIG. 15 for position corresponding to the evening.

Each of these two thermal sensors 50*a*, 50*b* includes a surface absorbing the solar radiation, which is preferably black, as well as a heat exchanger (not illustrated).

This heat exchanger includes a primary circuit heated by the direct solar radiation coming from the sun when the latter is visible, but also from the diffuse radiation present all throughout the day.

This primary circuit heats the secondary circuit in which the same coolant circulates as that circulating in the concentrator tube 3, thereby accentuating its heating.

Figure 16:
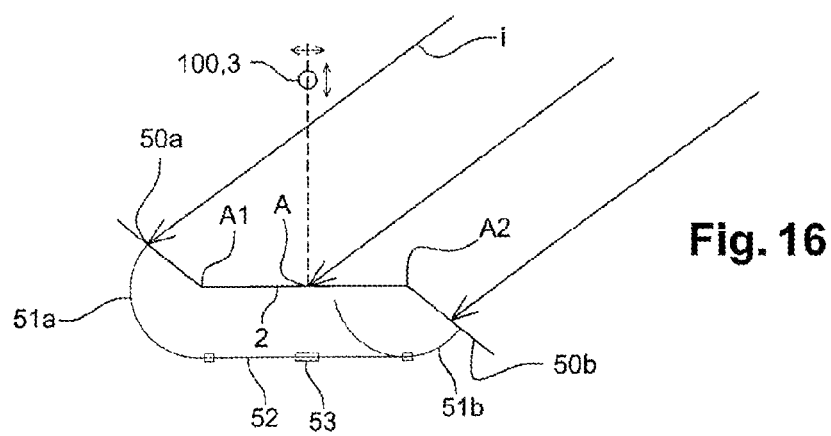
FIG. 16 illustrates the mechanical interaction between two thermal sensors of the solar sensor in its first position illustrated in FIG. 13.
Figure 17:
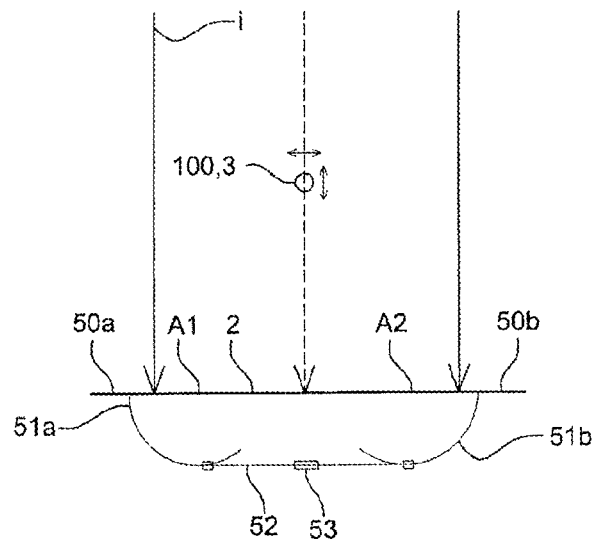
FIG. 17 illustrates the mechanical interaction between two thermal sensors of the solar sensor in its second position illustrated in FIG. 14.
Figure 18:
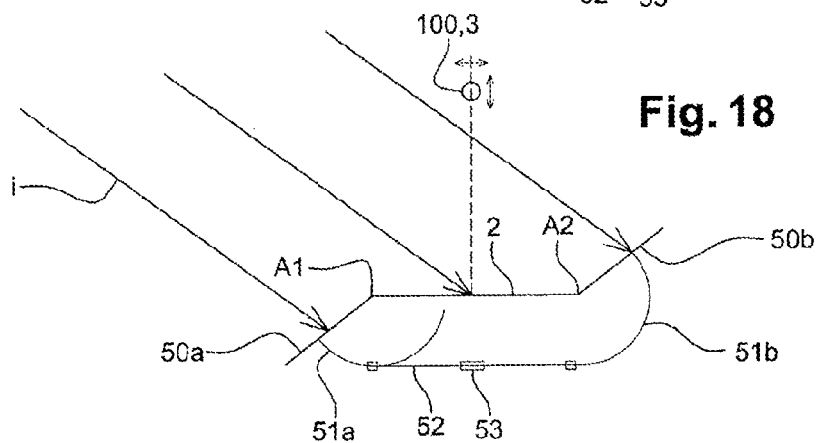
FIG. 18 illustrates the mechanical interaction between two thermal sensors of the solar sensor in its third position illustrated in FIG. 15.

As illustrated in FIGS. 16 to 18, the first heat exchanger 50*a* is positioned transversely to the tangent at an endpoint of a first toothed crown 51*a* in the shape of an arc of circle centered on the axis A1 and the second heat exchanger 50*a* is positioned transversely to the tangent at an endpoint of a second toothed crown 51*b* in the shape of an arc of circle centered on the axis A2.

The rotational movement of the two toothed crowns 51*a*, 51*b* and, by extension, of the two heat exchangers 50*a*, 50*b* is coupled using a worm 52 with a pitch similar to that of the notched crowns 51*a*, 51*b*.

The worm 52 is rotated using a drive motor 53.

The drive motor 53, controlled by machine (not illustrated), pulses the appropriate number of revolutions to the worm, which orients the thermal sensors 50*a*, 50*b* on either side.

The symmetry of the movements makes it possible to simplify the mechanism of this control device to a single worm 52 controlled by a single drive motor 53 and a single machine.

Depending on the size of the assembly, similar control devices may be added.

Furthermore, with such a control device, the mechanical play is very reduced, the interlocks are simple, and it is easy to monitor any position discordance.

According to one alternative, these thermal sensors 50*a*, 50*b* can be replaced by photovoltaic modules.

Conversely, according to another alternative, these thermal sensors 50*a*, 50*b* perform their normal heat exchange function, but the concentrator tube 3 is replaced by a photovoltaic module.

Of course, in such a case, these photovoltaic modules are not connected to the concentrator tube 3.

Figure 19:
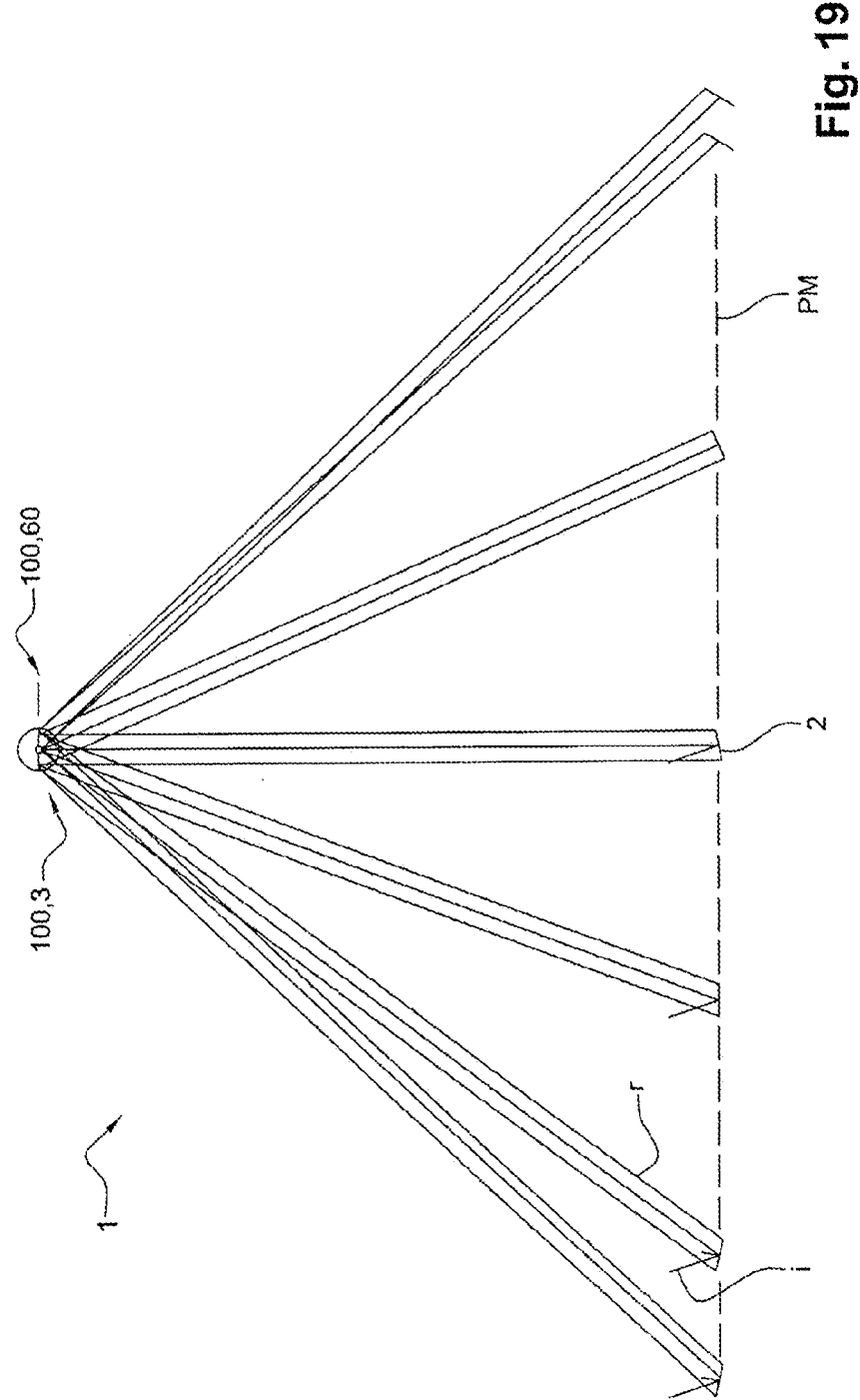
FIG. 19 illustrates an overall view of one embodiment of the solar sensor combining both exploitation of the thermal radiation and exploitation of the light radiation.
Figure 20:
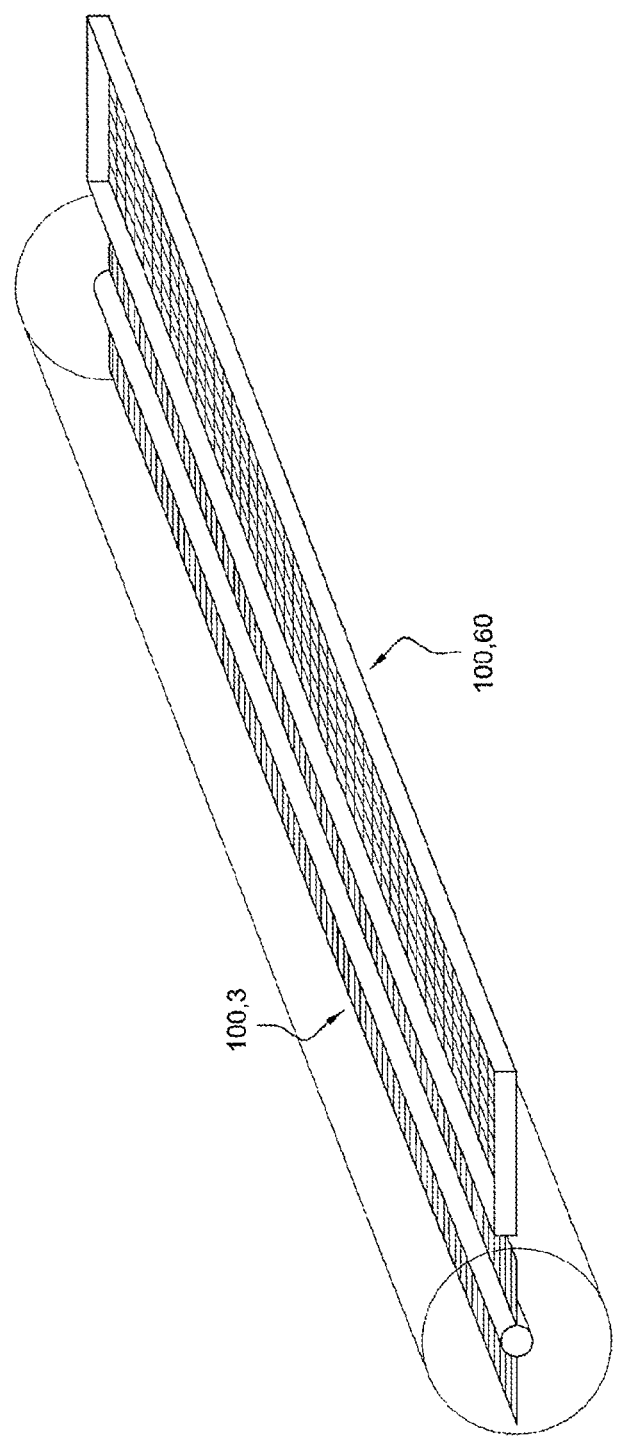
FIG. 20 illustrates a partial view of the solar sensor illustrated in FIG. 19.

According to another alternative compatible with the different embodiments previously presented, illustrated in FIGS. 19 and 20, the solar sensor 1 includes, on the one hand, a concentrator element 100 made up of a movable concentrator tube 3 positioned in the same way as in the previous described embodiments in which it is used, and on the other hand, a concentrator element made up of a movable photovoltaic module 60, positioned near the concentrator tube 3 and oriented toward the primary mirrors 2. This photovoltaic module 60 has a longilineal shape following the direction of the concentrator tube 3 and is subjugated to the same movements as the latter.

Thus, according to the chosen exploitation, the planar mirrors 2 may be oriented more toward the concentrator tube 3 to heat the coolant or more toward the photovoltaic module 60 to produce electricity.

Although the invention has been described relative to specific embodiments, it is of course in no way limited thereto and encompasses all technical equivalents of the described means as well as combinations thereof if they are within the scope of the invention.

In this way, a solar power station 1 according to the invention may include two or more concentrator tubes 3, interchangeable with one another, as well as two or more photovoltaic modules 60, made movable using movement means 10, 20, 30.

In this embodiment, it is thus possible to provide maintenance operations on one of the concentrator tubes 3 made idle, as well as on one of the photovoltaic modules 60, without having to stop the production of the solar power station 1, which is ensured by the other concentrator tube 3.

Also, the worm 52 can thus be replaced by a translatable rack sized to allow rotational movement of the toothed crowns 51*a*, 51*b* from stop to stop.

The invention claimed is:

1. A solar power station comprising:
   a set of primary mirrors, each primary mirror being made of a planar strip of mirror;
   a support for said set of primary mirrors,
   each primary mirror pivoting around a corresponding large axis of rotation corresponding to a longitudinal axis of said each primary mirror, and
   the set of primary mirrors being configured to collect the rays of the sun so as to concentrate them toward an arrangement of one or more concentrator elements of the same nature or different natures,
   a mover for moving one or more concentrator elements so as to make it movable relative to the support of the set of primary mirrors, the mover including a moving part for transverse movements allowing movement of the one or more concentrator elements in a vertical plane and in a direction substantially transverse to the direction of the large axes of the set of primary mirrors,
   an actuator for rotating the set of primary mirrors around their corresponding large axes as a function of the height of the sun and in which the movement of the one or more concentrator elements created by the mover depends on the movements of the set of primary mirrors.

2. The solar power station according to claim 1, wherein the one or more concentrator elements comprising a concentrator tube passed through by a coolant.

3. The solar power station according to claim 1, wherein the one or more concentrator elements comprising a photovoltaic module.

4. The solar power station according to claim 1, comprising a secondary mirror designed to reflect toward the one or more concentrator elements part of the radiation reflected by the set of primary mirrors that does not directly reach the one or more concentrator elements and in which the secondary mirror follows the movement of the one or more concentrator elements and is rotatably movable around a main axis of the one or more concentrator elements.

5. The solar power station according to claim 1, comprising a secondary mirror wherein the secondary mirror has an opening angle whereof a bisector is oriented in rotation around the one or more concentrator elements to coincide with a bisector of the angle formed by an intersection of two extreme reflected rays among a plurality of reflected rays reflected by the set of primary mirrors.

6. The solar power station according to claim 1, comprising a device for making the positioning of the set of primary mirrors idle in case of strong wind.

7. The solar power station according to claim 1, comprising a device for making the positioning of the set of primary mirrors idle, autonomous and with positive security in the event of a loss of current.

8. The solar power station according to claim 1, comprising a device for putting the set of primary mirrors and/or the one or more concentrator elements in a maintenance position.

9. The solar power station according to claim 1, comprising an automated cleaning device for the set of primary mirrors alone or with a secondary mirror.

10. The solar power station according to claim 2, comprising at least one thermal sensor arranged to absorb a diffuse radiation from the sun.

11. The solar power station according to claim 10, wherein the at least one thermal sensor comprises a heat exchanger in communication with the coolant circulating in the concentrator tube.

12. The solar power station according to claim 10, wherein the at least one thermal sensor is rotatably movable around an axis of substantially the same direction as the large axis of each primary mirrors of the set of primary mirrors.

13. The solar power station according to claim 1, wherein the set of primary mirrors comprise a rear surface including photovoltaic modules, the pivoting movement of each primary mirrors of the set of primary mirrors around their respective large axes in relation to the support allowing a rear surface to take the place of a front surface and vice versa.

14. A solar power station comprising:
- a set of primary mirrors, each primary mirror being made of a planar strip of mirror,
- a support for said set primary mirrors,
- each primary mirror pivoting around a corresponding large axis of rotation corresponding to a longitudinal axis of each said primary mirror,
- the set of primary mirrors being configured to collect the rays of the sun so as to concentrate them toward an arrangement of one or more concentrator elements of the same nature or different natures,
- wherein the large axes of the set of primary mirrors are comprised in a same plane,
- a mover for moving one or more concentrator elements so as to make it movable relative to the support of the set of primary mirrors, the mover including a moving part for transverse movements allowing movement of the one or more concentrator elements(s) in a vertical plane and in a direction substantially transverse to the direction of the large axes of the set of primary mirrors,
- an actuator for rotating the set of primary mirrors around their corresponding large axes as a function of the height of the sun and in which the movement of the one or more concentrator elements created by the mover depends on the movements of the set of primary mirrors.

* * * * *